May 27, 1969 | F. F. GRANT | 3,446,088

VARIABLE RATIO DRIVE

Filed July 10, 1967 | Sheet 1 of 2

INVENTOR.
FREDERIC F. GRANT

BY Warren T. Jessup
ATTORNEY

May 27, 1969 F. F. GRANT 3,446,088

VARIABLE RATIO DRIVE

Filed July 10, 1967 Sheet 2 of 2

INVENTOR.
FREDERIC F. GRANT
BY
Warren T. Jessup
ATTORNEY

United States Patent Office 3,446,088

Patented May 27, 1969

3,446,088

VARIABLE RATIO DRIVE

Frederic F. Grant, Bellflower, Calif., assignor, by mesne assignments, to Astro-Science Corporation, South El Monte, Calif., a corporation of Texas Filed July 10, 1967, Ser. No. 652,283
Int. Cl. F16h *15/12, 15/50;* G11b *15/44*
U.S. Cl. 74—190.5 5 Claims

ABSTRACT OF THE DISCLOSURE

A friction wheel or wheels couple a driving pulley or disk to a driven disk. The coupling wheel is movable so as to contact the disks at a variable distance from their shafts, thereby permitting a variation in coupling ratio between the two disks. The coupling wheel is steered across the surface of the two disks so as to maintain substantially constant transmission of torque from the driving disk to the driven disk even though the speed of the driving disk may change. The device is particularly applicable to the maintaining of constant tension in the reeling of a flexible member, such as magnetic tape, from a feed reel to a takeup reel.

BACKGROUND OF THE INVENTION

Many modern arts call for the reeling of a flexible member from a feed reel to a takeup reel. Examples are the transport of magnetic tape, punched tape, photographic film, and the like. Satisfactory operation of such devices usually requires the maintenance of substantially constant tension in the flexible member as it is drawn from the feed or supply reel to the takeup reel.

Prior art systems for accomplishing this object have involved a plurality of drive capstans placed along the tape at spaced intervals, with the speed of the capstan being carefully controlled. Such devices usually require independent drives and braking mechanisms for the takeup and feed reels, respectively, in order to give control over the tape tension. The principal complexity is introduced by the fact that the torque arm applied to the reels by the tape is constantly changing as the tape is fed from the takeup reel to the feed reel. This inherent property in the reeling of the tape from one reel to the other requires a wide range of power requirements, because, as the radii of the tape on the reel changes, the power required also changes.

SUMMARY OF THE INVENTION

The present invention consists of a drive well adapted for a tape transport system involving only a single-drive capstan with a drive link between reels so designed that the coupling ratio within the drive link is constantly changing in accordance with the radii of the tape on the reels, so as to require minimum, substantially constant, power applied to the capstan to drive the tape. Two species of the invention are shown to illustrate the scope of the present invention.

DESCRIPTION OF THE PREFERRED EMBODIMENTS

*First species*

Figure 1:
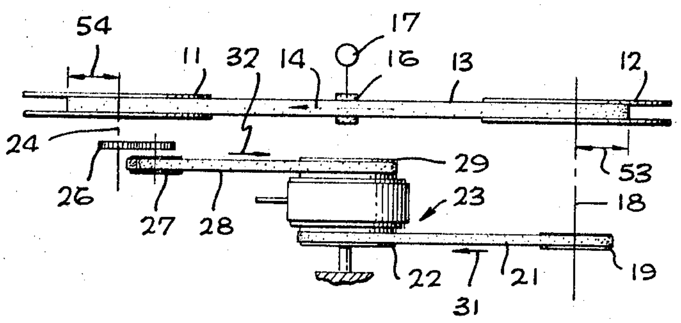
FIGURE 1 is an overall view of the first species illustrated.

Referring to FIGURE 1, 11 and 12 represents a pair of reels, between which extends a flexible member such as a magnetic tape 13. The reels 11 and 12 may alternately serve as takeup and feed reels, respectively. For ease of understanding of this disclosure, it will be assumed that the reel 11 is serving as the takeup reel and 12 as the feed reel. Thus, the tape 13 is moving to the left in FIGURE 1, as shown by the arrow 14. The tape 13 is driven in conventional fashion by capstan means shown at 16, powered by any suitable motive means shown schematically at 17.

Reel 12 is coupled by shaft means shown schematically at 18 to a pulley 19 linked by a belt 21 to a pulley wheel 22, forming a portion of a variable ratio coupling 23 which will be described in detail hereinafter. Reel 11 is coupled by a shaft, shown schematically at 24, through reverse gearing 26, to a pulley 27, which in turn is linked by a belt 28 to another pulley wheel 29, complementary to the pulley wheel 22, and also forming a portion of the variable ratio coupling 23.

As the capstan 16 rotates, it engages the tape 13, frictionally or by sprocket, to pull it from the reel 12. This rotates the reel 12 and, through the linkage heretofore described, also causes the pulley wheel 22 to rotate. Arrow 31 indicates the linear movement of the upper portion of the belt 21. Through an internal coupling wheel to be described hereinafter, the pulley wheel 22 causes the pulley wheel 29 to rotate, in the direction indicated by the arrow 32 on the belt 28. Through the coupling 28, 27, 26 and 24 heretofore described, this causes the take-up reel 11 to rotate in a direction to take up the tape 13 with a constant predetermined tension in the tape, between the reels 11 and 12.

Figures 2, 3, 4:
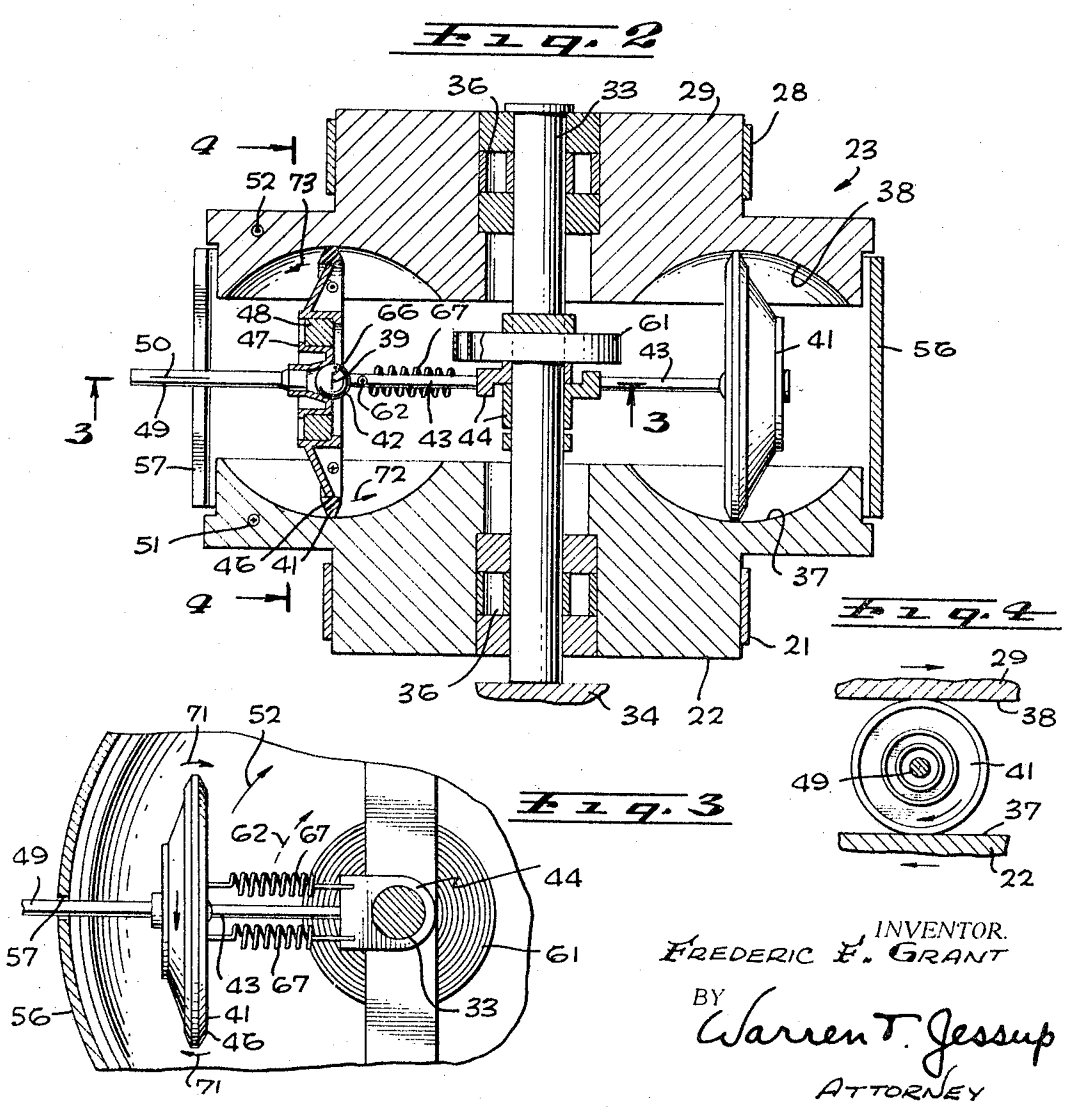
FIGURE 2 is a sectional view of the variable ratio coupling mechanism of the system shown in FIGURE 1.
FIGURE 3 is a fragmentary sectional view taken on line 3—3 in FIGURE 2.
FIGURE 4 is a fragmentary sectional view taken on line 4—4 in FIGURE 2.

As shown in the sectional view FIGURE 2, the variable ratio coupling 23 consists of an axle or shaft 33 stationarily mounted to any suitable housing or frame shown schematically at 34. The pulley wheels 22 and 29 are coaxially mounted to rotate on the shaft 33 by bearings indicated at 36. In the embodiment illustrated, the pulley wheels 22 and 29 are substantially identical. Wheel 22 has an arcuate groove 37 centered about the axle 33. The pulley wheel 22 has a corresponding groove 38. As shown in the drawing, the cross sectional surface of the grooves 37 and 38 lies on a circle centered at 39. Within the grooves 37 and 38 and spanning the wheels 22 and 29 are one or more coupling wheels 41. Each wheel 41 is mounted on a universal ball joint 42 centered at the point 39 and supported on the end of a radial spider or rod 43, the inner end of which is secured to a bushing 44 rotatably mounted on the shaft 33. The coupling wheel 41 has a pliant periphery such as a rubber tire 46, which bears against the respective grooves 37 and 38 to frictionally couple the pulley wheels 22 and 29.

The wheel 41 has a hub 47 universally mounted on the ball 42, which carries a bearing 48 on which the wheel 41 is mounted for rotation about an axis 50, represented by the rod 49. The rod is secured to and projects from the hub 47. Its function will be described hereinafter.

From the description thus, far, the following rudiments of the operation will be evident. Assume that the wheel 41 is oriented as shown in FIGURE 2, i.e., with its plane tangential to an imaginary cylinder centered on the shaft 33. As described hereinbefore in connection with FIGURE 1, it will be assumed that the pulley wheel 22 is being driven by the belt 21 in such a rotative direction that the lefthand side of the wheel 22 in FIGURE 2 is moving away from the viewer, as indicated by the symbol 51.

Assuming that the radial supporting rod or spider 43 is not moving with respect to the shaft 33, the rotation of the pulley wheel 22 will be imparted to the pulley wheel 29 through rotation of the coupling wheel 41, so that the wheel 29 rotates in the opposite direction and at the same speed. Thus, the lefthand side of the wheel 29 will be coming toward the viewer, as indicated by the symbol 52.

Under these conditions, the reel 11 will be driven in a take-up direction at the same speed as the reel 12 is being pulley by tape 13 in a feedout direction. This is the condition appropriate for equal radii of tape on the two reels, i.e., the radius 53 of the tape 13 on the feed reel 12 is equal to the radius 54 of the tape 13 on the takeup reel 11.

As the tape 13 is fed from the reel 12 to the reel 11, the radius 53 is constantly decreasing while the radius 54 is constantly increasing. Hence, in a few moments it will be necessary to cause the reel 11 to turn at a lower speed than the reel 12, or else there will be excessive tension in the tape 13. It is the function of the variable ratio coupling 23 to bring about a constant alteration of this speed ratio, by the details which will now be described.

Figure 5:
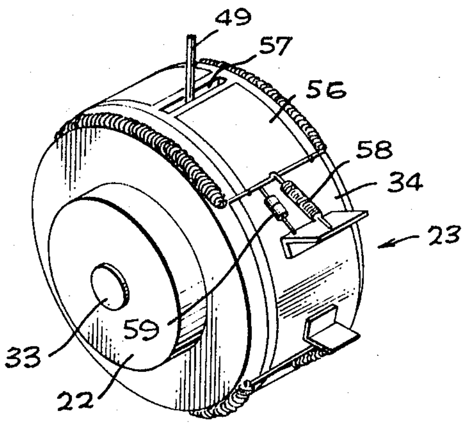
FIGURE 5 is a perspective view of the coupling mechanism of FIGURE 2.

The coupling 23 is contained in a cylindrical housing represented by the numeral 34 (FIGURES 5 and 2). The periphery of the housing 34 carries an arcuate frame 56 having a slot 57 parallel to the shaft or axle 33, through which projects the rod 49. The frame 56 is mounted to slide circumferentially about the housing 34 and is biased to a given angular position by a spring 58 which in operation may be placed in either tension or compression. Paralleling the spring 58 is a dash pot 59 which damps oscillations of the frame 56 caused by the rod 49.

A torsion spring 61 (FIGURE 2) is mounted coaxially about the axle 33. The inner end thereof is secured to the axle 33, while the outer end is secured to the sleeve or bushing 44. The function of the spring 61 is to apply a threshold torque to the spider 43 about the axle 33, which torque is proportional to the tension which it is desired to maintain in the tape 13 between the reels 11 and 12. In the case being illustrated, the spring 61 is stressed so as to torque the spider 43 clockwise in FIGURE 3 with respect to the stationary axle 33, as shown by the arrowed line 62. This represents a torque which biases the spider 43 toward the viewer in FIGURE 2, as indicated by the appropriate symbol 62 in FIGURE 2.

From the description thus far, it will be seen that the wheel 41 is rotatable about three orthogonally related axes, which will now be defined for ease of understanding of the operation to be described hereinafter. In transmitting power from the pulley wheel 22 to the pulley wheel 29, the coupling wheel 41 rotates about the axis 50, which will be called the coupling wheel axis. The ball mounting 42 for the hub 47 permits the wheel 41 to rotate about an axis perpendicular to the plane of the paper and represented by the point 39. This will be called the tangential axis because it lies on a line which is tangential to an imaginary cylinder formed about the axle 33. The ball mounting 42 also permits the hub 47 to rotate about an axis at right angles to both 39 and 50 and represented by the line 66. This will be called the steering axis, for reasons which will become apparent as the description proceeds.

In order to bias the hub 47 to a central position about the steering axis 66, a pair of tension springs 67 are provided, one on each side of the spider 43, extending from the hub 47 to the bushing or sleeve 44.

The variable speed operation of the coupling 23 will now be described.

As described hereinbefore, at the moment when the radii 53 and 54 are equal, the pulley wheels 22 and 29 should be coupled so as to be turning at the same speed. The coupling wheel 41 is thus oriented in FIGURE 2. Moments thereafter, assuming the speed of capstan drive 16 to be constant, the reel 12 has increased slightly in speed because of the decreased radius at 53. This causes a proportionate increase in angular velocity of the pulley wheel 22. The pulley wheel 29 is still going at its old speed. The pulley wheel 22 is thus, at the moment under consideration, turning slightly faster than is the pulley wheel 29.

To understand the reaction of the coupling wheel 41, it will be simpler to assume that the pulley wheel 29 is stopped and the pulley wheel 22 is moving slowly in its previous direction, namely, in the direction indicated at 51. Under these circumstances, the bottom part of the tire 46 will move away from the viewer, as will the center of the wheel represented by the ball 42. The outer, extended end of the rod 49 is restricted in its movement in or out of the plane of the paper, i.e., toward or away from the reader, because it is captured in the slot 57. The wheel 41 will, therefore, turn or be steered about the steering axis 66. It will thus be turned slightly in the direction indicated by the arrows 71 in FIGURE 3. The wheel 41 will in this manner be steered slightly toward a different path within the grooves 37 and 38.

As a result of this steering action, the continued rotation of the pulley wheel 22, as indicated at 51, will cause the bottom portion of the tire 46 to move to the right as indicated by the arrow 72, while the top portion of the tire 46 moves to the left as indicated by the arrow 73. This locates the points of contact between the coupling wheel 41 and the grooves 37 and 38, respectively. The radius of contact with the pulley wheel 22 is less, while the radius of contact with the pulley wheel 29 is greater. This decreases the velocity ratio of coupling from the pulley wheel 22 to the pulley wheel 29, so that the wheel 29 is now driven to turn at a slightly slower speed than the wheel 22. This compensates for the increase in tape radius 54 and corresponding decrease in tape radius 53.

As noted, the function of the torsion spring 61 is to maintain a preset tension in the tape 13. This can be best understood by imagining the capstan 16 to be at a standstill while the securement points of the spring 61 are adjusted so as to place a predetermined torque on the spider 43 with respect to the axle 33. If this torque is represented by the arrow 62, it will be seen that through the friction of the wheel 41 on wheels 22 and 29, a preset torque in the same direction is applied to the pulley wheel 29 and thus applied to the reel 11. The same torque is applied through the wheel 41 to the pulley wheel 22, but in the opposite direction to which it would normally turn, so that there is a resisting torque applied to the reel 12 to counter the torque applied by the reel 11. Thus, the longitudinal tension force on the tape 13 is equalized at both directions, producing a predetermined tensile stress in the tape 13 as desired.

The reason for mounting the slot 57 so as to be circumferentially movable is to prevent hunting of the rod 49 during the operation of the device. By allowing the frame 56 to give way against the resistance of the spring 58 and dashpot 59, a damping action is applied to the rod 49. This inhibits the tendency to hunt.

While theoretically not required, it has been found that the steering springs 67 also serve a very useful function in inhibiting oscillation or hunting of the coupling wheel 41 as it seeks its position of equilibrium between the wheels 22 and 29.

*Second species*

Figure 6:
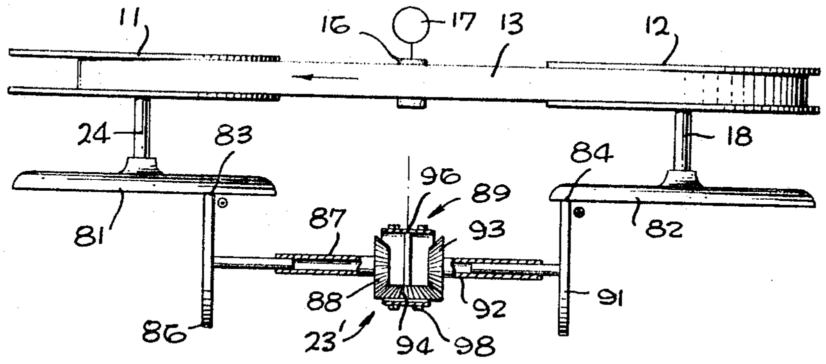
FIGURE 6 is a view of a second species of the invention here illustrated.
Figure 7:
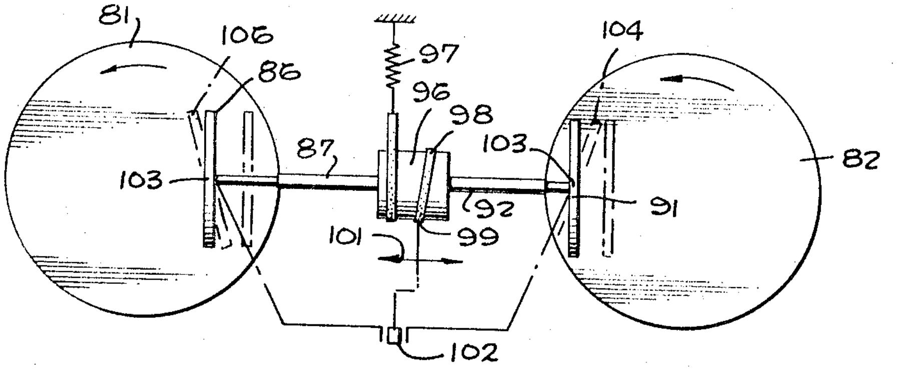
FIGURE 7 is a side view of the system illustrated in FIGURE 6.

A second species of the invention is illustrated in FIGURES 6 and 7. In this form of the invention, each of the reels 11 and 12 is coupled to substantially identical flat disks 81 and 82. Coupling means 23' couples the disks 82 and 81 by frictionally engaging the disks at variable engagement points 83 and 84.

The coupling means 23' comprises a rubber-tire wheel 86 frictionally engaging the disk 81 at right angles and splined to a shaft 87, on the end of which is a gear 88 forming a portion of a differential coupling 89. A corresponding wheel 91 bears frictionally against the disk 82 and is splined to the shaft 92, having the gear 93 on the end thereof. The gears 93 and 88 are coupled by the differential coupling gear 94, pivotally mounted in the differential housing 96.

When the tape radius on reel 11 is the same as that on reel 12, engagement points 83 and 84 are at equal radii from their respective shafts 24 and 18. Under this condition, the gears 88 and 93 are turning at the same speed and in opposite directions, thereby causing no net rotation of the housing 96.

Mechanism is provided for mutually adjusting these radii as follows: The housing 96 is mounted for limited rotation about the axis of the shafts 87 and 92, and is biased in a given direction by a spring 97. A helical band or groove 98 is provided on the surface of the housing 96 in which rides a sensor, shown schematically at 99. The longitudinal position of the sensor 99, along the axis 101, is linked through any suitable servo system, shown schematically at 102, to steering connections 103 between the wheels 86 and 91 and their respective shafts.

When the disk 82 begins to acquire a velocity greater than that of disk 81, a rotation speed difference between gears 88 and 93 causes the housing 96 to rotate slightly against the bias of the spring 97. This causes a corresponding longitudinal movement of the follower 99, which, through the servo 102, steers the wheels 86 and 91 in an appropriate direction to change their radii of contact to compensate for the change in speed required between disks 81 and 82. In the example shown, the wheel 91 will be steered slightly toward the direction shown by the dotted lines 104, thereby decreasing the drive radius of the disk 82 against the wheel 91. Simultaneously, the wheel 86 will be steered in the direction shown by the dotted line 106 so as to acquire a greater drive radius between the disk 81 and the wheel 86.

In this way the coupling mechanism 23' automatically adjusts the relative speeds of the reels 11 and 12 to accommodate the constantly changing radii of the tape 13 on the respective reels, while at the same time maintaining the constant tension in the tape 13 predetermined by the setting of the spring 97.

What is claimed is:

1. Variable speed ratio coupling means, comprising:
an axle;
a pair of coaxial pulley wheels rotatable on said axle, each having a circular groove coaxial with said axle, said grooves facing each other and being arcuate in cross section;
a coupling wheel;
means mounting said coupling wheel on said axle to be rotatable about a coupling wheel axis, with said coupling wheel being disposed between said pulley wheels in frictional engagement with said grooves, thereby to couple rotation about said axle of one of said coaxial pulley wheels to the other;
said mounting means mounting said coupling wheel on said axle, with said coupling wheel axis being rotatable about an axis tangential to an imaginary cylinder coaxial with said axle and formed about the axis of rotation of said coaxial pulley wheels, whereby the engagement points of said coupling wheel with said grooves may be shifted, thereby to change the coupling ratio between said coaxial pulley wheels, and with said coupling wheel axis being rotatable about a steering axis substantially perpendicular to said tangential axis and to said coupling wheel axis, whereby said coupling wheel may be steered, thereby to cause said coupling wheel to turn on said tangential axis.

2. Means in accordance with claim 1, including means for biasing said coupling wheel about said steering axis to a central position, such that a radial line from the center of said coupling wheel to the axis of said pulley wheels is perpendicular to said tangential axis.

3. Means in accordance with claim 1, wherein said mounting means includes means for enabling said coupling wheel to revolve about the axis of said coaxial pulley wheels.

4. Means in accordance with claim 3, including biasing means for biasing said coupling wheel in a given angular direction about said axis of said pulley wheels.

5. The variable speed ratio coupling means defined in claim 1, in which said coupling wheel responds to a rotational speed differential between said pulley wheels to turn about said steering axis thereby causing said coupling wheel to turn about said tangential axis and thereby compensate for such rotational speed differential.

References Cited

UNITED STATES PATENTS

| | | | |
|---|---|---|---|
| 2,125,999 | 8/1938 | Erban | 74—200 |
| 2,914,266 | 11/1959 | Connell | 242—55.14 |
| 3,306,549 | 2/1967 | Eberhardt et al. | 242—67.5 |
| 3,327,546 | 6/1967 | Gordon et al. | 74—200 XR |
| 3,327,958 | 6/1967 | Tolnai | 242—55.14 |

FOREIGN PATENTS

| | | |
|---|---|---|
| 28,062 | 3/1956 | Germany. |

FRED C. MATTERN, Jr., *Primary Examiner.*

JAMES A. WONG, *Assistant Examiner.*

U.S. Cl. X.R.

74—200, 201; 242—55.14